Patented Aug. 20, 1929.

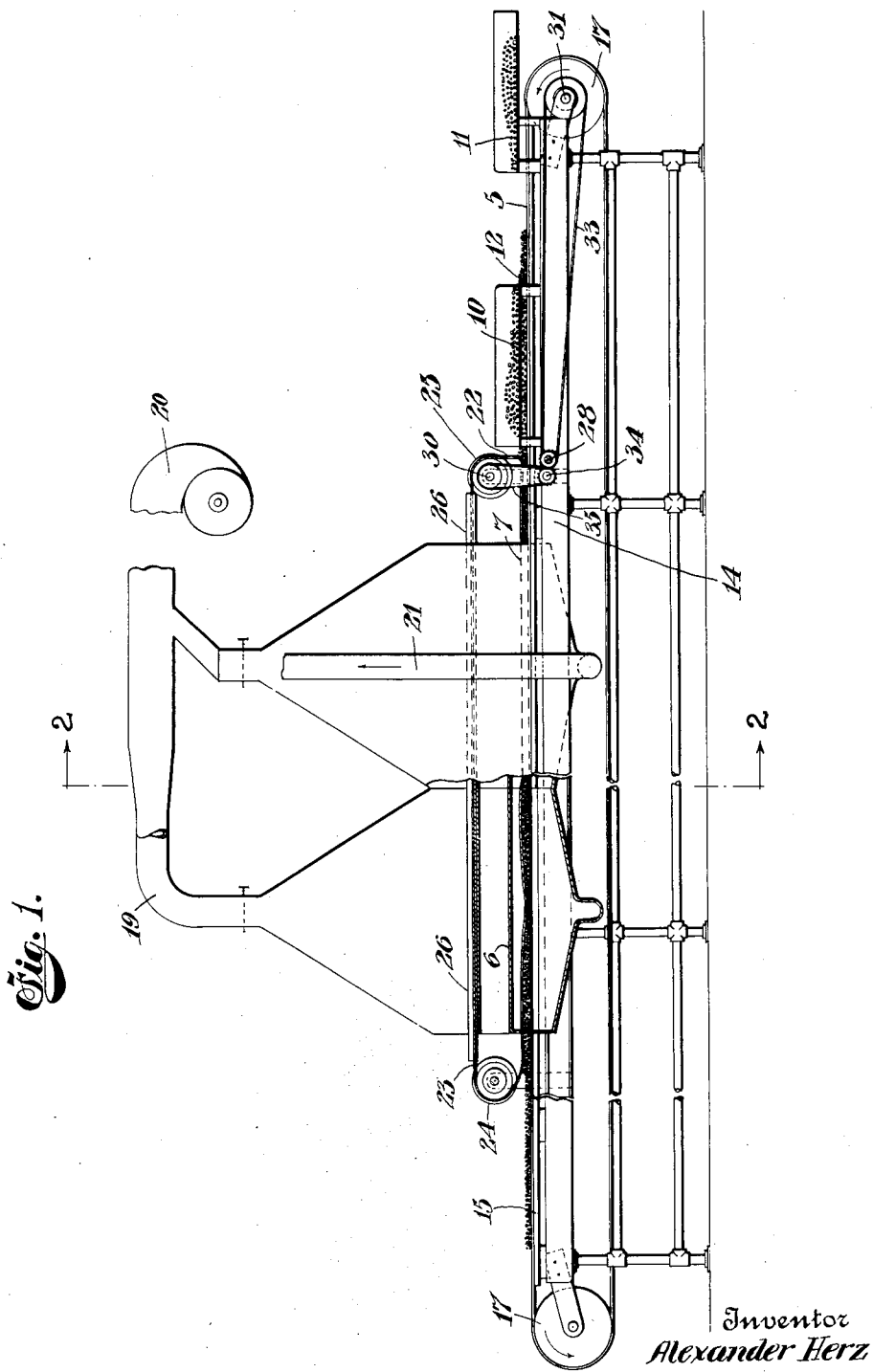

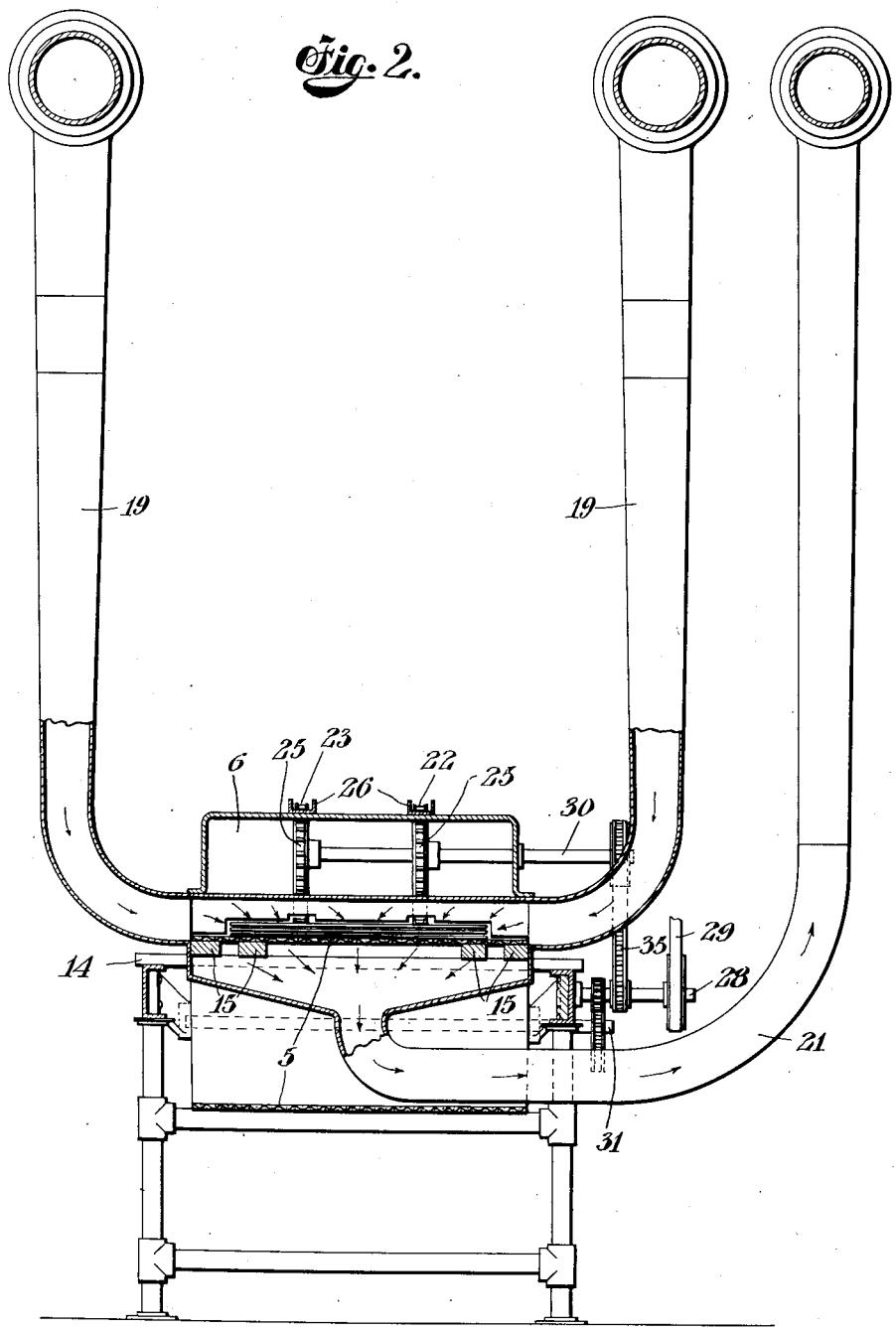

1,725,138

UNITED STATES PATENT OFFICE.

ALEXANDER HERZ, OF NEW ROCHELLE, NEW YORK.

APPARATUS FOR COOLING DRINKING TUBES.

Application filed April 5, 1924, Serial No. 704,541. Renewed January 16, 1929.

The present invention relates to apparatus for cooling drinking tubes after they have been treated with hot paraffin or the like.

Drinking tubes as commonly manufactured are coated with hot paraffin to stiffen and waterproof the paper. Before these tubes can be packaged it is desirable to cool and dry them in order that they may be cool and stiff for handling and may not adhere to each other in the packages.

The present invention has for an object to provide an apparatus whereby the tubes after they are dipped in the hot paraffin can be expeditiously cooled and dried preparatory to packaging.

The nature and objects of the invention will be better understood from a consideration of a particular illustrative embodiment thereof, for the purposes of which description reference should be had to the accompanying drawing forming a part hereof and in which Figure 1 is a side view partly in section of apparatus embodying the invention.

Figure 2 is a sectional view taken on the line 2—2 of Figure 1.

In the construction shown for the purpose of illustrating the invention, the freshly paraffined drinking tubes are spread in a relatively thin layer upon a conveyor which may be of any suitable type such as a wire screen endless belt 5 on which conveyor they pass through one or more hoods 6, 7, where they are cooled as by a current of air.

Two tables 10, 11 are provided at the feeding end of the belt to which for convenience the freshly paraffined tubes can be delivered as they are brought from the paraffining bath. From the tables the tubes are spread upon the continuously moving belt 5 in a layer of suitable thickness. A gauge 12 facilitates maintaining the layer of substantially uniform thickness upon the belt. The upper run of the belt travels along the top of the table 14 on ways 15, 15 which are spaced to permit cooling air to flow freely through the conveyor belt. At either end of the table the belt passes over suitable rolls 17, 17, one or both of which may be positively driven at the desired speed.

Cooling air is suitably supplied to the hoods 6, 7. As shown, the air is supplied to the hoods through pipes 19, 19, preferably under pressure, as by means of a blower 20 and is preferably also exhausted as by means of a suction fan connected to the suction pipe 21 to reduce the amount of air leaking from the hoods into the room.

The drinking tubes are relatively light. It is therefore desirable to provide means for holding the same upon the conveyor to prevent disturbance by the current of air. In the apparatus shown the tubes are arranged transversely of the conveyor and a pair of link belts or chains which may conveniently be roller chains 22, 23 engage the tubes near either end to hold them down. The chains are carried by the sprocket wheels 24, 25 in position to allow the lower slack runs of the chains to lie upon the tubes and hold the same in position against any tendency of the current of air to disturb them. The chains may be of such weight as to hold the tubes in place without crushing them. The upper runs of these chains are preferably supported by ways such as channel bars 26, 26 so that the sagging will all occur in the lower runs.

The chains are of sufficient length to provide the necessary slack and the sprocket wheels 24 are positively driven at a speed substantially that of the conveyor so that the conveyor belt and the retaining chains travel at approximately the same speed.

The drive shaft 28 may be driven from any suitable source of power, as by means of a belt 29, and this shaft is connected to one of the rolls 17 and to the shaft 30 carrying the sprocket wheels 25 by any suitable means to drive both at substantially the same speed. As shown, the shaft 31 carrying the roll 17 is positively driven from the shaft 28 by means of a sprocket chain 33 and suitable sprockets on the respective shafts. The shaft 34 is connected to the shaft 28 by means of suitable intermeshing gears and the shaft 30 is driven from the shaft 34 by means of a sprocket chain 35 and suitable sprockets on the respective shafts.

The foregoing description of the particular apparatus shown in the drawing is illustrative merely and is not to be construed as defining the limits of the invention.

Claims:

1. Apparatus for cooling drinking tubes comprising, in combination, a conveyor belt arranged to carry a layer of transversely arranged tubes, means for forcing air through the layer of tubes to cool the same, a chain and sprocket wheels for supporting and driving said chain at a speed substantially equal to that of the conveyor belt, a continuous support for the upper run of said chain, the lower run of said chain being slack and arranged to rest upon the layer of tubes to hold the same against displacement.

2. Apparatus of the character described for use in cooling paraffined drinking tubes comprising, in combination, an endless tube carrying belt arranged to receive a layer of drinking tubes extending transversely thereof, means for forcing air through such layer of tubes, two parallel chains for holding said tubes against displacement on the carrying belt and means for driving said chains at the speed of the belt.

3. Apparatus for cooling drinking tubes comprising in combination a conveyor belt arranged to carry a layer of transversely arranged tubes, a feed table positioned over the belt and a gauge positioned a predetermined distance above the belt to determine the depth of the layer of tubes on the belt, means for forcing air through the layer of tubes, a chain, and sprocket wheels for supporting and driving said chain in position to hold the tubes on the belt by the weight of the chain alone, substantially as and for the purpose described.

4. Apparatus of the character described for use in cooling paraffined drinking tubes comprising, in combination, an endless tube carrying belt arranged to receive a layer of drinking tubes extending transversely thereof, means for arranging the tubes on the tube carrying belt in a layer of predetermined thickness, means for forcing air through such layer of tubes and two parallel chains for holding said tubes against displacement on the carrying belt and means for driving said chains at the speed of the belt.

5. Apparatus for cooling paraffined tubes comprising in combination, a traveling conveyor arranged to support the tubes on its moving upper surface, said upper surface being supported on ways, an endless flexible device having its lower portion resting freely upon said tubes on said conveyor and traveling therewith but without movement relative thereto, said conveyor and said device being of open work throughout for free passage of air and means for forcing air through the passing assembly.

6. Apparatus for aerating elongated tubes comprising in combination, a traveling conveyor arranged to support a transversely disposed layer of tubes, means to serve a blast of air at either end of said layer of tubes so as to pass the air inward between them, said conveyor being perforated for free passage of air downward therethrough, and means resting on said tubes for preventing their displacement upon the conveyor.

7. Apparatus for aerating elongated tubes comprising in combination, a traveling conveyor arranged to support a transversely disposed layer of tubes, means to serve a blast of air at either end of said layer of tubes so as to pass the air inward between them, said conveyor being perforated for free passage of air downward therethrough, means resting on said tubes for preventing their displacement upon the conveyor, and means for receiving the air beneath the center of said layer of tubes.

8. Apparatus of the character described for aerating tubes comprising in combination, an endless tube carrying belt arranged to receive a layer of tubes, means for forcing air through the layer of tubes, spaced sprockets, an endless chain hanging freely on its lower span from said sprockets so as to rest upon the layer of tubes but having no movement relative to the movement of the belt, and means to prevent the slack of said chain passing to the upper span thereof.

In testimony whereof, I have signed my name to this specification this 3rd day of April, 1924.

ALEXANDER HERZ.